(12) United States Patent
Seo et al.

(10) Patent No.: US 7,716,443 B2
(45) Date of Patent: May 11, 2010

(54) APPARATUS AND METHOD FOR CONTROLLING MEMORY INTERFACE

(75) Inventors: Yoon-bum Seo, Seongnam-si (KR); Keun-cheol Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 11/696,384

(22) Filed: Apr. 4, 2007

(65) Prior Publication Data
US 2008/0072006 A1  Mar. 20, 2008

Related U.S. Application Data

(60) Provisional application No. 60/845,774, filed on Sep. 20, 2006.

(30) Foreign Application Priority Data
Oct. 30, 2006  (KR) ............... 10-2006-0105631

(51) Int. Cl.
G06F 12/00  (2006.01)
(52) U.S. Cl. .................. 711/167; 365/233.1
(58) Field of Classification Search .......... 711/167; 365/233.1
See application file for complete search history.

(56) References Cited

U.S. PATENT DOCUMENTS

| | | | |
|---|---|---|---|
| 5,278,974 A * | 1/1994 | Lemmon et al. | 713/600 |
| 6,185,629 B1 * | 2/2001 | Simpson et al. | 710/10 |
| 6,366,530 B1 * | 4/2002 | Sluiter et al. | 365/240 |
| 6,487,648 B1 | 11/2002 | Hassoun | |
| 6,493,818 B2 * | 12/2002 | Robertson | 712/27 |
| 6,526,462 B1 * | 2/2003 | Elabd | 710/242 |
| 6,845,436 B1 | 1/2005 | Wu | |
| 2003/0221078 A1 | 11/2003 | Jeddeloh | |
| 2006/0036828 A1 * | 2/2006 | Jeddeloh | 711/167 |
| 2008/0052481 A1 * | 2/2008 | Oh | 711/167 |

FOREIGN PATENT DOCUMENTS

| | | |
|---|---|---|
| JP | 2003-108433 A | 4/2003 |
| KR | 1020020019375 A | 3/2002 |
| KR | 1020040100713 A | 12/2004 |

\* cited by examiner

*Primary Examiner*—Christian P Chace
*Assistant Examiner*—Hashem Farrokh
(74) *Attorney, Agent, or Firm*—Sughrue Mion, PLLC

(57) ABSTRACT

An apparatus and method for controlling a memory interface are provided. The apparatus includes a memory controller controlling a memory and a clock generator applying a system bus clock signal and a memory clock signal to the memory controller. The memory controller applies a memory clock signal having a frequency higher than the frequency of the system bus clock signal to the memory. Accordingly, a high data transfer bandwidth can be obtained with the same cost and effort as for manufacturing a conventional system-on-chip (SOC) while using a memory having a high operating speed.

20 Claims, 10 Drawing Sheets

APPARATUS AND METHOD FOR CONTROLLING MEMORY INTERFACE

CROSS-REFERENCE TO RELATED PATENT APPLICATION

This application claims the benefit of Korean Patent Application No. 10-2006-0105631, filed on Oct. 30, 2006, in the Korean Intellectual Property Office, and the benefit of U.S. Provisional Patent Application No. 60/845,774, filed on Sep. 20, 2006, in the U.S. Patent and Trademark Office, the disclosures of which are incorporated herein in their entirety by reference.

BACKGROUND OF THE INVENTION

1. Field of the Invention

Apparatuses and methods consistent with the present invention relate to controlling a memory interface, and more particularly, to controlling a memory interface to increase a data transfer bandwidth in a memory interface.

2. Description of the Related Art

Recently, most digital devices use inexpensive Synchronous Dynamic Random Access Memories (SDRAMs) as main data storage units. SDRAMs are classified into Single Data Rate (SDR) SDRAM and Double Data Rate (DDR) SDRAM according to a data rate per SDRAM clock pulse. In both SDR SDRAM and DDR SDRAM data is written or read in synchronization with a clock signal. Conventional SDRAM controllers in a system-on-chip (SOC) process input and output by synchronizing an SDRAM clock with a system bus clock, that is, by using the clocks with the same frequency.

FIG. 1 is a block diagram of a conventional apparatus for controlling an SDRAM interface 100. Referring to FIG. 1, a plurality of master modules 103 and an SDRAM controller 102 are connected to a system bus 104, and an SDRAM 101 is connected to the SDRAM controller 102. Data is transmitted or received from the master modules 103 to the SDRAM controller 102 via the system bus 104 in response to a system bus clock signal. An SDRAM clock signal processes input/output of data between the SDRAM controller 102 and the SDRAM 101 in synchronization with the system bus clock signal. The SDRAM clock signal is applied to the SDRAM 101 in order to transfer data between the SDRAM controller 102 and the SDRAM 101.

FIG. 2 illustrates clock signal and data transmitting/receiving paths of a conventional SDRAM controller 202. Referring to FIG. 2, a system bus clock signal transferred from a system bus 201 to an SDRAM controller 202 is inputted to an SDRAM via a buffer 203. Write data is written to the SDRAM through a buffer 204 in response to the system bus clock signal. A data strobe signal DQS is output to the SDRAM through a buffer 206 in response to the system bus clock signal. The data strobe signal DQS is also 90°/180° shift delayed by a 90°/180° shift delay unit 207. Data stored in the SDRAM is read in such a manner that read data is latched by the 90°/180° shift-delayed data strobe signal and sent to a flip-flop 205. Read data of the SDRAM is transferred to the SDRAM controller 202 in synchronization with the system bus clock signal, and thus the SDRAM controller 202 operating in synchronization with the system bus clock signal can easily conform to the internal timing of an apparatus for controlling an SDRAM interface. Accordingly, the SDRAM controller is easy to design in the viewpoint of data input/output timing and thus the SDRAM controller is widely used.

FIG. 3 is a timing diagram of a data writing operation of a conventional DDR SDRAM. Referring to FIG. 3, data DQ is inputted to and outputted from the SDRAM at the same frequency as a system bus clock signal because the system bus clock signal and an SDRAM clock signal CK have the same frequency.

However, to increase the frequency of the SDRAM clock signal used to transfer data between the SDRAM controller and the SDRAM to in turn raise a data transfer rate, operating frequencies of master modules connected to a system bus must be also increased. Thus, it is very difficult or impossible to design the apparatus for controlling the SDRAM interface.

While high-speed memories, such as DDR2 SDRAM, DDR3 SDRAM and Rambus DRAM, have recently been developed and form the basis for increasing system performance, the frequency of the system bus clock signal has to be increased in order to use SDRAM having a higher clock frequency. Accordingly, there is a limitation in using SDRAM for a medium-and-low priced SOC because of excessive overhead for a chip size, high power consumption and an increase in the manufacturing cost.

SUMMARY OF THE INVENTION

The present invention provides an apparatus and method for controlling a memory interface, which applies a memory clock signal having a frequency higher than the frequency of a system bus clock signal to a memory to obtain a higher data transfer bandwidth with the same cost and effort as for manufacturing the conventional SOC.

According to an aspect of the present invention, there is provided an apparatus for controlling a memory interface comprising a memory controller controlling a memory, and a clock generator connected to the memory controller and applying a system bus clock signal and a memory clock signal to the memory controller. The memory controller applies the memory clock signal having a frequency higher than the frequency of the system bus clock signal to the memory.

The memory may be an SDRAM which is one of an SDR SDRAM, a DDR SDRAM, a DDR2 SDRAM, a DDR3 SDRAM and a Rambus DRAM.

The frequency of the memory clock signal may correspond to an integer multiple of the frequency of the system bus clock signal.

The memory controller may comprise a first First In, First Out (FIFO) memory that buffers write data received from a system bus in response to the system bus clock signal and outputs the write data to the memory in response to the memory clock signal.

The first FIFO memory may comprise a first clock input part receiving the system bus clock signal, a second clock input part receiving the memory clock signal, a data input part receiving the write data in response to the system bus clock signal, and a data output part outputting the write data in response to the memory clock signal.

The memory controller may comprise a second FIFO memory that buffers data read from the memory in response to the memory clock signal and outputs the read data to the system bus in response to the system bus clock signal.

The second FIFO memory may comprise a first clock input part receiving the system bus clock signal, a second clock input part receiving the memory clock signal, a data input part receiving the read data in response to the memory clock signal, and a data output part outputting the read data in response to the system bus clock signal.

The clock generator may be located outside or inside the memory controller.

The clock generator may be made with a Phase-Locked Loop (PLL) or a Delay-Locked Loop (DLL).

The memory controller may be located outside or inside an soc.

According to another aspect of the present invention, there is provided an apparatus for controlling a memory interface comprising a memory controller controlling a memory and a clock generator generating a system bus clock signal and a memory clock signal having a frequency higher than the frequency of the system bus clock signal. The memory controller comprises a finite state machine receiving the system bus clock signal from the clock generator and outputting a control signal or an address signal in integrated states in response to the system bus clock signal, and a control/address signal generator receiving the memory clock signal from the clock generator and sequentially outputting detailed states of the integrated states received from the finite state machine to the memory.

The memory may be an SDRAM which is an SDRAM selected from the group consisting of a SDR SDRAM, a DDR SDRAM, a DDR2 SDRAM, DDR3 SDRAM and a Rambus DRAM.

The apparatus may further comprise a timing register transmitting Alternating Current (AC) timing parameters to the control/address signal generator.

The control/address signal generator may sequentially output the respective states of the integrated states to the memory to satisfy the AC timing parameters received from the timing register.

The clock generator may be made with a PLL or a DLL.

The frequency of the memory clock signal may correspond to an integer multiple of the frequency of the system bus clock signal.

The integrated states may include at least two states.

The detailed states included in the integrated states may be set in order.

According to another aspect of the present invention, there is provided a method of controlling a memory interface comprising receiving a system bus clock signal and a memory clock signal having a frequency higher than the frequency of the system bus clock signal from a clock generator, and applying the memory clock signal to a memory.

The memory may be an SDRAM selected from the group consisting of an SDR SDRAM, a DDR SDRAM, a DDR2 SDRAM, DDR3 SDRAM and a Rambus DRAM.

The frequency of the memory clock signal may correspond to an integer multiple of the frequency of the system bus clock signal.

The method may further comprise buffering write data received from a system bus and outputting the write data to the memory in response to the memory clock signal.

The method may further comprise buffering data read from the memory and transferring the read data to a system bus in response to the system bus clock signal.

The system bus clock signal or the memory clock signal may be generated outside or inside the memory controller.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
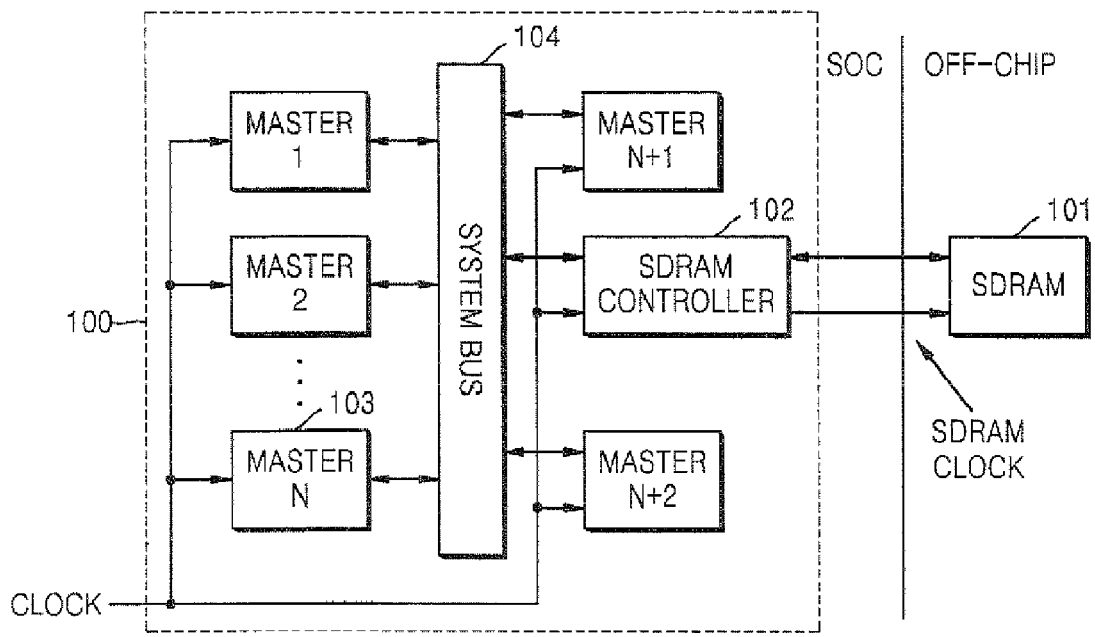
FIG. 1 is a block diagram of a conventional apparatus for controlling an SDRAM interface.
Figure 2:
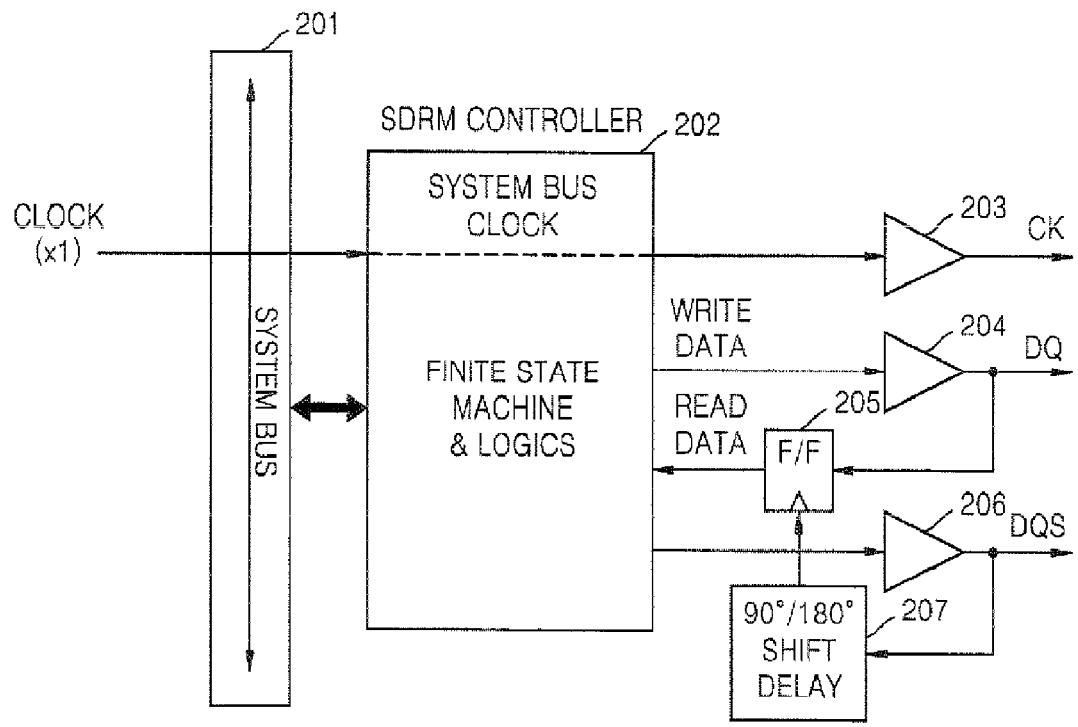
FIG. 2 illustrates clock signal and data transmitting/receiving paths of a conventional SDRAM controller.
Figure 3:
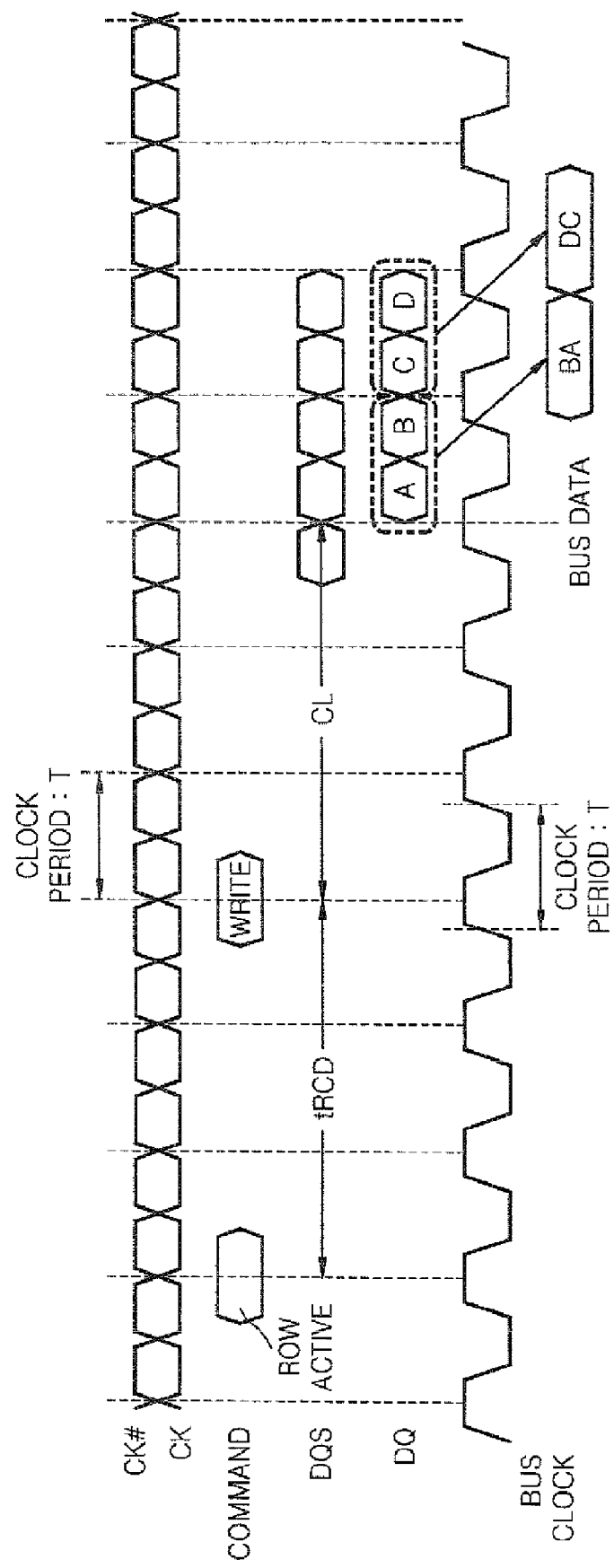
FIG. 3 is a timing diagram of a data writing operation of a conventional DDR SDRAM.

The present invention will now be described more fully with reference to the accompanying drawings, in which exemplary embodiments of the present invention are shown. The present invention may, however, be embodied in many different forms and should not be construed as being limited to the exemplary embodiments set forth herein; rather, these exemplary embodiments are provided so that this disclosure will be thorough and complete, and will fully convey the concept of the present invention to those skilled in the art. Throughout the drawings, like reference numerals refer to like elements.

Figure 4:
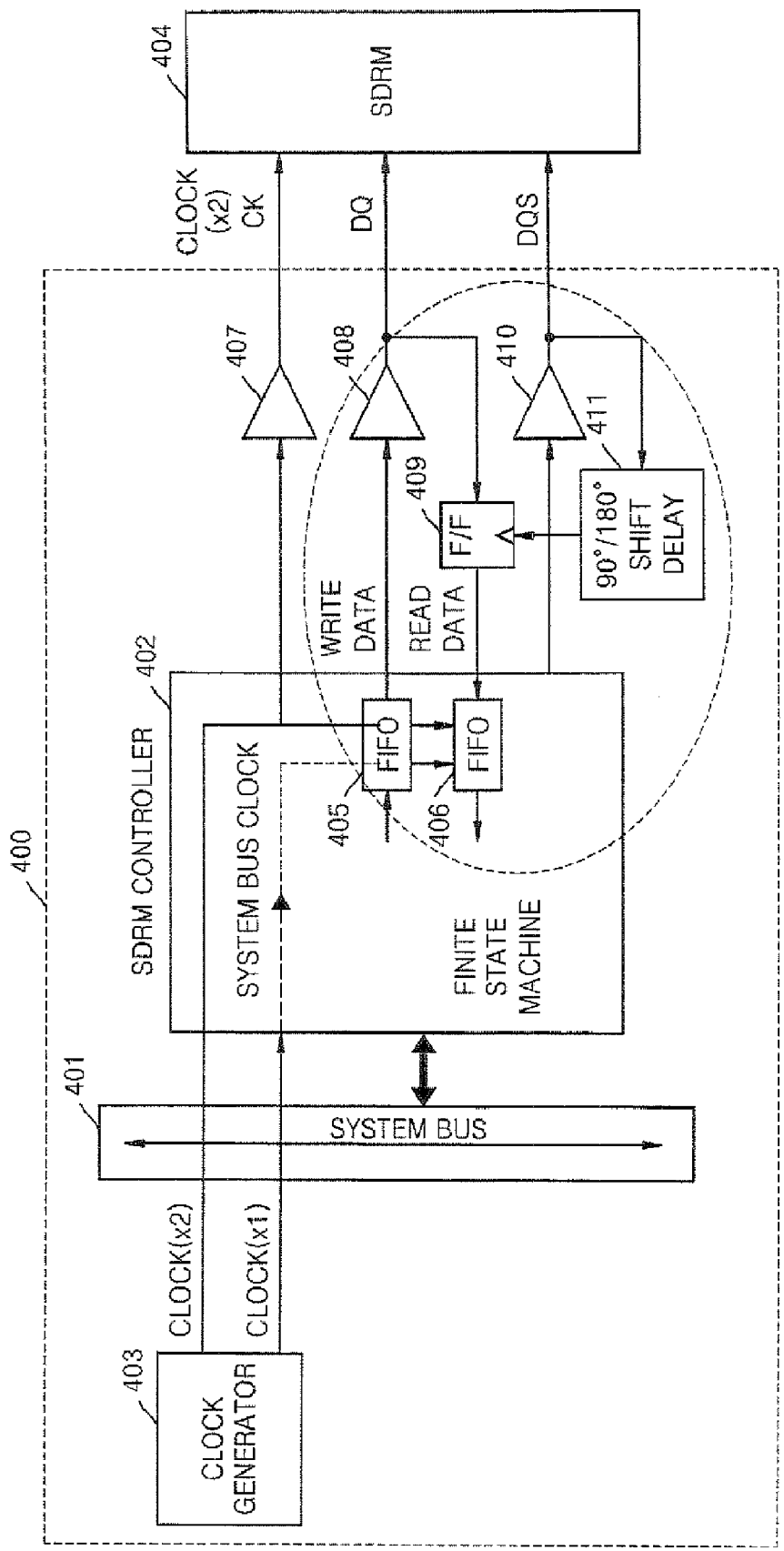
FIG. 4 illustrates a part for controlling write data or read data in the apparatus for controlling an SDRAM interface according to an exemplary embodiment of the present invention.

FIG. 4 illustrates a part for controlling write data or read data in the apparatus for controlling an SDRAM interface 400 according to an exemplary embodiment of the present invention. Referring to FIG. 4, a clock generator 403 generates a system bus clock signal used to transfer data in to a SOC. Furthermore, the clock generator 403 generates an SDRAM clock signal CK used for an SDRAM interface between an SDRAM 404 and an SDRAM controller 402. The SDRAM clock signal CK is applied to the SDRAM 404 in order to transfer data between the SDRAM controller 402 and the SDRAM 404. The clock generator 403 may be made with a PLL or a DLL.

The SDRAM clock signal CK generated by the clock generator 403 is transferred to the SDRAM 404 through the SDRAM controller 402 and an SDRAM interface. The clock generator 403 may be located outside or inside the SDRAM controller 402.

The SDRAM 404 includes a Rambus DRAM to which a synchronized clock signal is applied as well as an SDR SDRAM, a DDR SDRAM, a DDR2 SDRAM and a DDR3 SDRAM. The SDRAM 404 writes or reads data at the request of a master module of the SOC and the SDRAM controller 402 controls the write and read operations. The SDRAM clock signal CK transferred from the clock generator 403 to the SDRAM controller 402 is inputted to the SDRAM 404 via a buffer 407. Write data is written to the SDRAM 404 in response to the SDRAM clock signal CK through a buffer 408. A data strobe signal DQS is output to the SDRAM 404 through a buffer 410 in response to the SDRAM clock signal CK. The data strobe signal DQS is also 90°/180° shift delayed by a 90°/180° shift delay unit 411. Data stored in the SDRAM 404 is read in such a manner that read data is latched by the 90°/180° shift-delayed data strobe signal and sent to a flip-flop 409.

Because the SDRAM 404 reads or writes data in synchronization with the frequency of the clock applied, the SDRAM 404 reads or writes data in synchronization with the frequency of the SDRAM clock signal CK transferred from the clock generator 403. Accordingly, for example, when the SDRAM clock signal CK having a frequency which is an integer multiple of the system bus clock signal is applied to the SDRAM 404, the data transfer rate of the SDRAM 404 is increased by an integer multiple of the system bus clock signal.

The SDRAM controller 402 controls an operation of writing data transferred from master modules through a system bus 401 to the SDRAM 404 and an operation of reading data stored in the SDRAM 404. The SDRAM controller 402 may be located outside/inside the SOC.

The SDRAM controller 402 receives not only the system bus clock signal but also the SDRAM clock signal CK having a frequency which is an integer multiple of the system bus clock signal. As described above, the frequency of the SDRAM clock signal CK for writing and reading SDRAM data is different from the frequency of the system bus clock signal used into the SOC. Thus, the apparatus for controlling an SDRAM interface 400 may include a FIFO memory for buffering data in a clock domain having different frequencies.

As illustrated in FIG. 4, a first FIFO memory 405 buffers write data received from the system bus 401 in response to the system bus clock signal, and then outputs the write data to the SDRAM 404 in response to the SDRAM clock signal CK. To achieve this, the first FIFO memory 405 includes clock input parts receiving the system bus clock signal and the SDRAM clock signal CK, a data input part receiving write data in response to the system bus clock signal, and a data output part outputting the received write data in response to the SDRAM clock signal CK. The first FIFO memory 405 is included in the apparatus for controlling the SDRAM interface 400 in order to achieve timing closure, and receives write data at a low clock frequency and outputs the write data at a high clock frequency to the SDRAM 404 to achieve timing closure.

A second FIFO memory 406 buffers data read from the SDRAM 404 in response to the SDRAM clock signal CK, and then outputs the read data to the system bus 401 in response to the system bus clock signal. The second FIFO memory 406 includes a first clock input part receiving the system bus clock signal, a second clock input part receiving the SDRAM clock signal CK, a data input part receiving read data in response to the SDRAM clock signal CK, and a data output part outputting the received read data in response to the system bus clock signal. That is, the second FIFO memory 406 receives read data at a high clock frequency from the SDRAM 404 and outputs the read data at a low clock frequency.

As described above, data is transmitted and received in response to the SDRAM clock signal CK having a frequency higher than the system bus clock signal only in data input/output parts in the viewpoint of the SOC. As a result, overhead of the SOC does not greatly increase.

Figure 5:
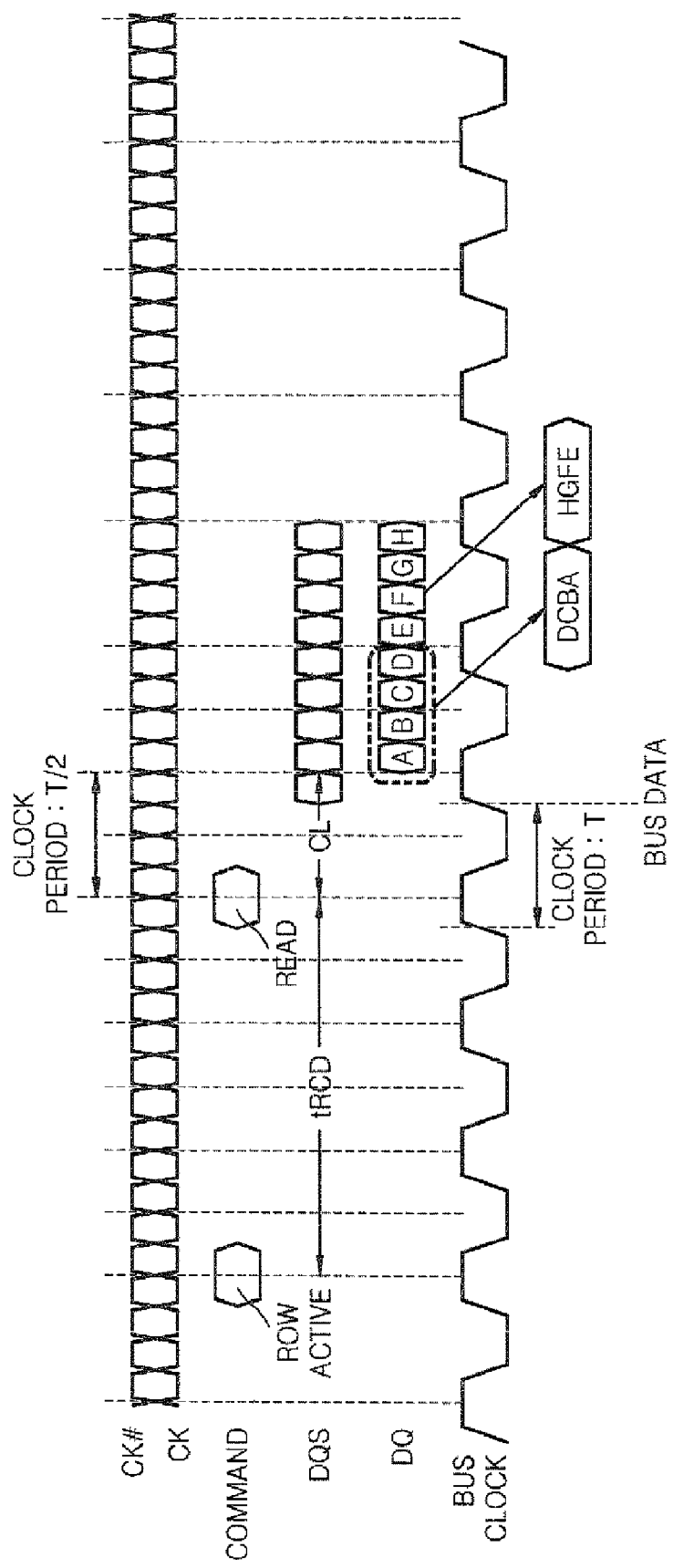
FIG. 5 is a timing diagram of a read operation of a DDR SDRAM according to an exemplary embodiment of the present invention.

FIG. 5 is a timing diagram of a read operation in a DDR SDRAM according to an exemplary embodiment of the present invention. FIG. 5 illustrates a case where the frequency of the SDRAM clock signal CK is twice the frequency of the system bus clock signal. Since the ratio of the frequency of the system bus clock signal to the frequency of the SDRAM clock signal CK is 1:2, data DQ is inputted to and outputted from the SDRAM 404 at a frequency of twice the system bus clock signal. Accordingly, while the frequency of the SDRAM clock signal CK used between the SDRAM controller 402 and the SDRAM 404 is increased to raise a data transfer rate, operating frequencies of modules connected to the system bus 401 are maintained.

Figure 6:
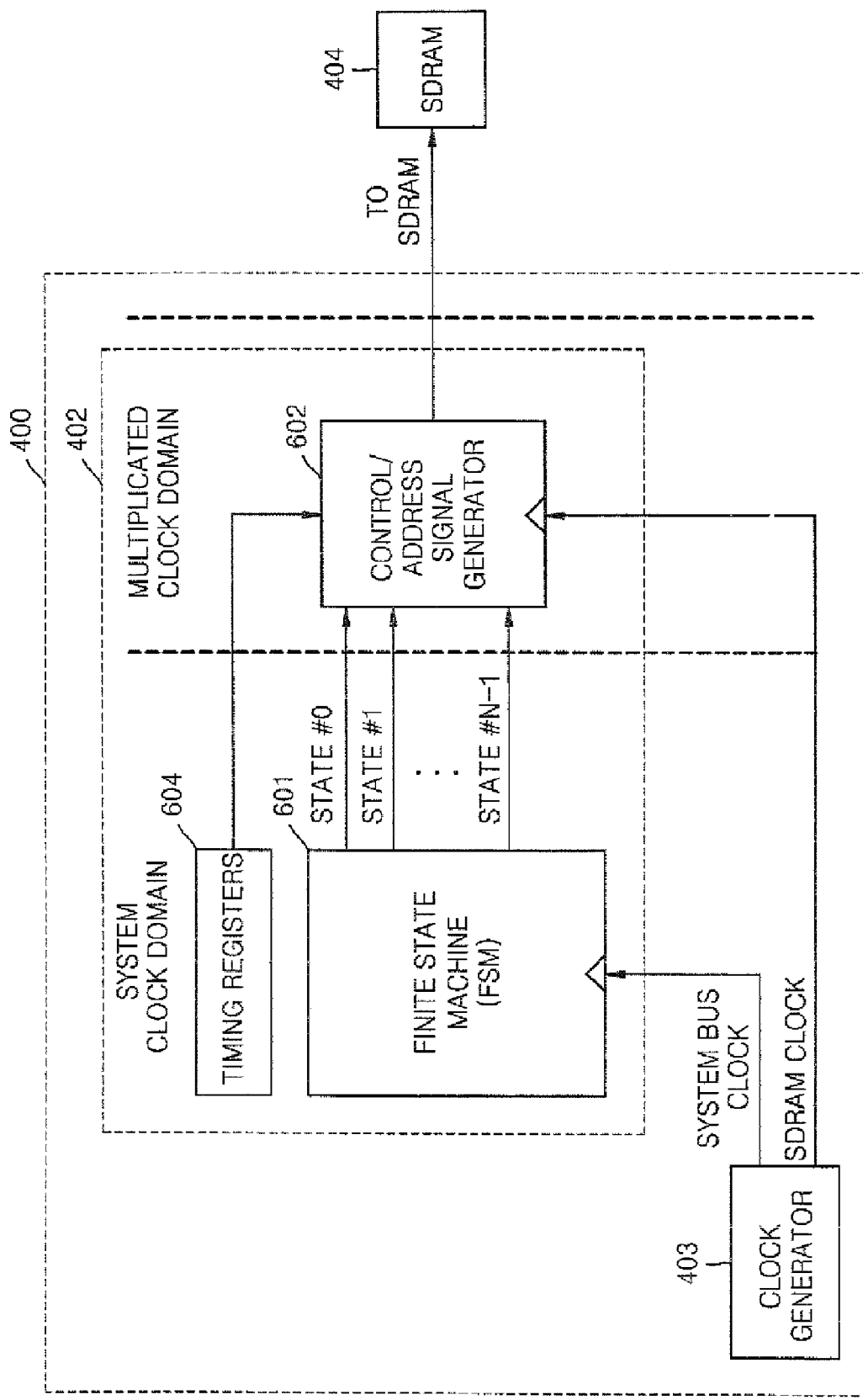
FIG. 6 illustrates a part for controlling a control signal or an address signal in the apparatus for controlling an SDRAM interface according to an exemplary embodiment of the present invention.

FIG. 6 illustrates a part for controlling a control signal or an address signal in the apparatus 400 for controlling an SDRAM interface according to an exemplary embodiment of the present invention. The apparatus 400 for controlling an SDRAM interface, the SDRAM controller 402, the clock generator 403 and the SDRAM 404 illustrated in FIG. 6 correspond to the apparatus 400 for controlling an SDRAM interface, the SDRAM controller 402, the clock generator 403 and the SDRAM 404 illustrated in FIG. 4, respectively.

Referring to FIG. 6, the clock generator 403 generates a system bus clock signal used to transfer data into the SOC and transfers the system bus clock signal to a finite state machine 601 of the SDRAM controller 402. Furthermore, the clock generator 403 generates an SDRAM clock signal CK used for an SDRAM interface between the SDRAM 404 and the SDRAM controller 402 and transfers the SDRAM clock signal CK to a control/address signal generator 602. The clock generator 403 may be made with a PLL or a DLL.

The finite state machine 601 of the SDRAM controller 402 controls a control signal or an address signal transferred from a master module through a system bus to be applied to the SDRAM 404.

Figure 7:
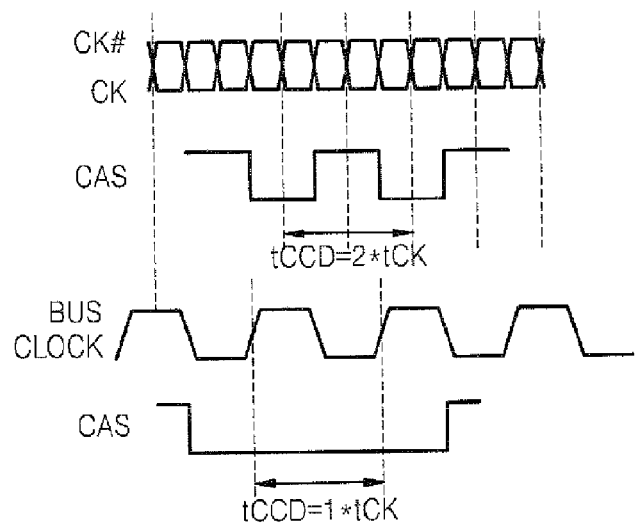
FIG. 7 is a timing diagram illustrating the generation of a dummy cycle when delay time from state CAS to state CAS (tCCD) corresponds to 2*Clock Period time (tCK)

The finite state machine 601 of the SDRAM controller 402 operates in synchronization with the system bus clock signal, and thus the control signal or the address signal is input to the SDRAM 404 in response to the system bus clock signal. However, while the system bus clock signal is applied to the finite state machine 601 of the SDRAM controller 402, the SDRAM clock signal CK having a frequency which is an integer multiple of the system bus clock signal is applied to an SDRAM interface according to an exemplary embodiment of the present invention. Accordingly, the control signal or the address signal should be applied to the SDRAM 404 in synchronization with the SDRAM clock signal CK. This generates a dummy cycle in the SDRAM interface. FIG. 7 is a timing diagram illustrating the generation of the dummy cycle when tCCD (delay time from state CAS to state CAS) corresponds to 2*tCK.

Figure 8:
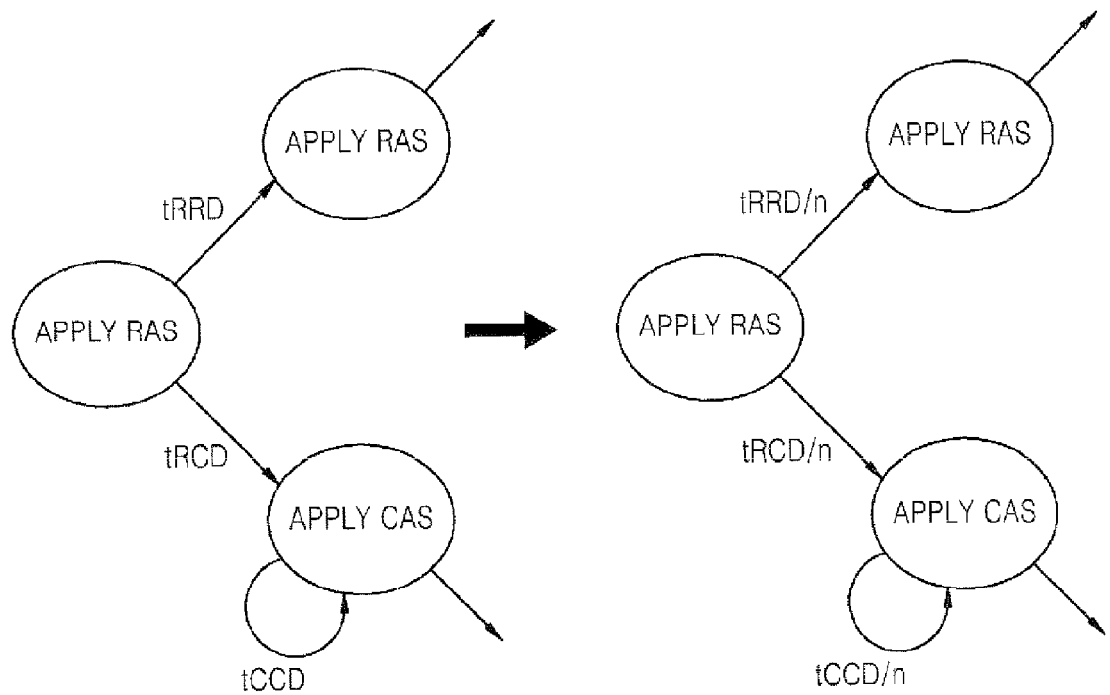
FIG. 8 conceptually illustrates variations in AC timing parameters when the ratio of a system bus clock signal to an SDRAM clock signal is 1:n.

FIG. 8 illustrates variations in AC timing parameters when the ratio of the system bus clock signal to the SDRAM clock signal CK is 1:n in order to remove the dummy cycle. Referring to FIG. 8, it is assumed when an SDRAM clock signal CK having the same frequency as the system bus clock signal is applied to the SDRAM 404, that AC timing parameters are tRRD, tRCD and tCCD. AC timing parameter tRRD represents delay time from state RAS to state RAS, AC timing parameter tRCD represents delay time from states RAS to CAS, and AC timing parameter tCCD represents delay time from state CAS to CAS. The AC timing parameters must be reduced to tRRD/n, tRCD/n and tCCD/n when the ratio of the system bus clock signal to the SDRAM clock signal CK is 1:n. However, the finite state machine 601 of the SDRAM controller 402 operates in synchronization with the system bus clock signal, and thus a minimum cycle of each state transition corresponds to a single system bus clock cycle. Accordingly, when the control signal or the address signal applied to the SDRAM 404 is varied within a single system bus clock cycle, the state of the control signal or the address signal cannot be represented.

Therefore, at least two transited states are integrated into one state if tRRD/n, tRCD/n or tCCD/n is less than a single system bus clock cycle. The finite state machine 601 outputs the integrated states for a single system bus clock cycle to transfer at least two detailed states transited within a single system bus clock cycle to the SDRAM 404. Here, to grant the order of the signal application, the finite state machine 601 sets the order for each state and sends it to the control/address signal generator 602.

The control/address signal generator 602 generates a control signal or address signal that should be applied by the SDRAM controller 402 to the SDRAM 404 because a clock domain of the SDRAM controller 402 is divided into two. The control/address signal generator 602 applies the control signal or the address signal to the SDRAM 404 in response to the SDRAM clock signal CK having a frequency higher than the system bus clock signal.

Figure 9:
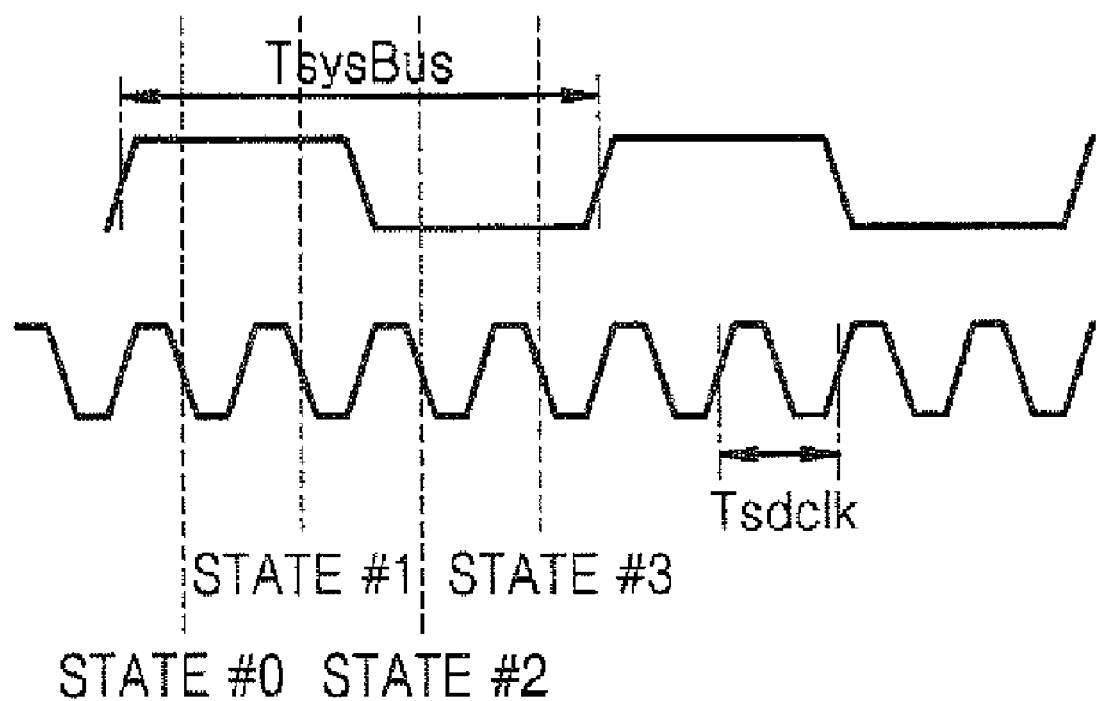
FIG. 9 illustrates states transferred to an SDRAM for a single system bus clock cycle when the ratio of a system bus clock signal to an SDRAM clock signal is 1:4.

FIG. 9 illustrates states transferred to the SDRAM 404 for a single system bus clock cycle when the ratio of the system bus clock signal to the SDRAM clock signal CK is 1:4. The control/address signal generator 602 sequentially outputs detailed states of the integrated states received from the finite state machine 601 to the SDRAM 404 in response to the SDRAM clock signal CK.

A timing register 604 makes the control/address signal generator 602 conform to minimum AC timing when the control/address signal generator 602 outputs the control signal or the address signal to the SDRAM 404. That is, when the control/address signal generator 602 transfers the control signal or the address signal with a delay smaller than a minimum delay of the SDRAM 404, a data error is generated (which is referred to as AC timing violation) because the control signal or the address signal is transferred at a speed faster than the speed that the SDRAM 404 can handle. Accordingly, an AC parameter (For example, tRRD/n, tRCD/n or tCCD/n) previously set in the timing register 604, which is a minimum delay, is transferred to the control/address signal generator 602 and the control/address signal generator 602 transfers the control signal or the address signal to the SDRAM 404 with appropriate timing according to the AC parameter.

Figure 10:
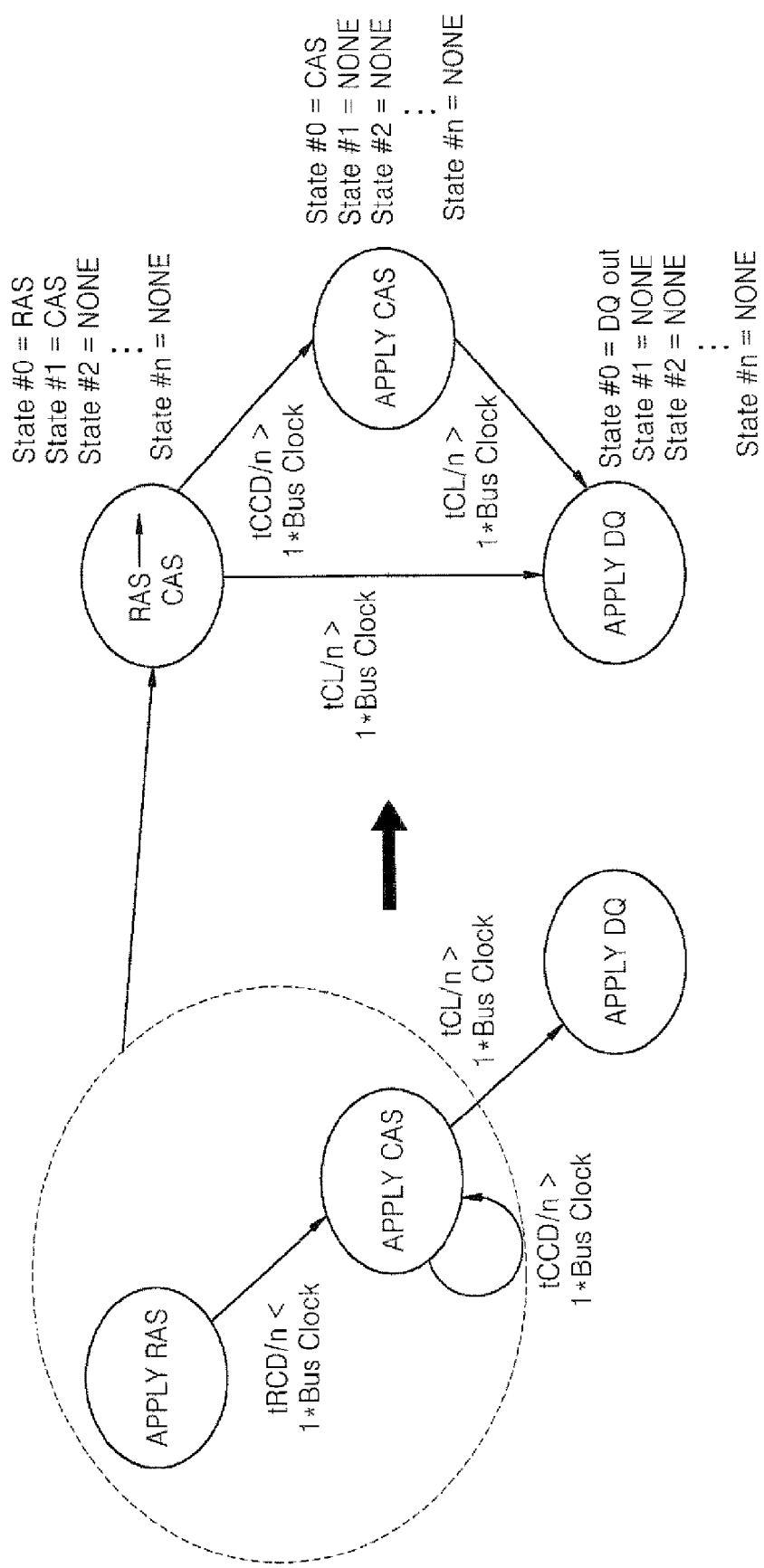
FIG. 10 illustrates integrated states outputted from a finite state machine when the ratio of a system bus clock signal to an SDRAM clock signal is 1:n according to an exemplary embodiment of the present invention.

FIG. 10 illustrates integrated states outputted from the finite state machine 601 when the ratio of the system bus clock signal to the SDRAM clock signal CK is 1:n according to an exemplary embodiment of the present invention. Referring to FIG. 10, n states outputted from the finite state machine 601 are integrated and inputted to the control/address signal generator 602 in order, and the control/address signal generator 602 sequentially outputs the detailed states of the integrated states to the SDRAM 404 to satisfy AC parameters.

Figure 11:
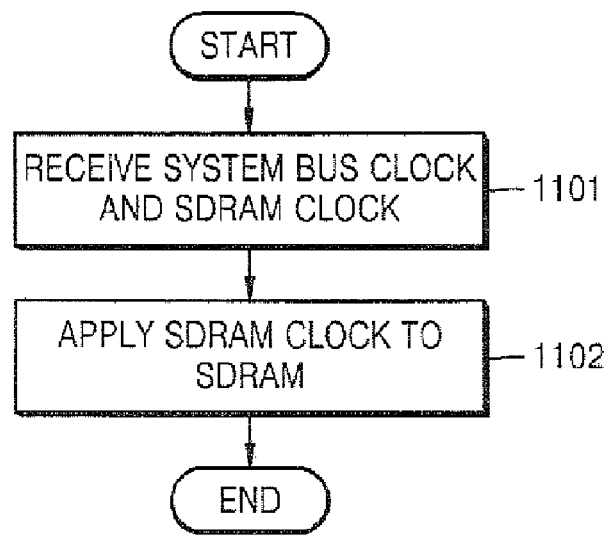
FIG. 11 is a flow chart of a method for controlling an SDRAM interface according to an exemplary embodiment of the present invention.

FIG. 11 is a flow chart of a method for controlling an SDRAM interface in an SDRAM controller according to an exemplary embodiment of the present invention. Referring to FIG. 11, the clock generator 403 generates the system bus clock signal and the SDRAM clock signal CK. Here, the frequency of the SDRAM clock signal CK is higher than the frequency of the system bus clock signal in order to increase a data transfer rate of the SDRAM interface. The system bus clock signal and the SDRAM clock signal CK may be generated outside or inside the SDRAM controller 402.

The SDRAM controller 402 receives the SDRAM clock signal CK and the system bus clock signal generated by the clock generator 403 via the system bus 401 in operation 1101. Data input transferred from the system bus 401 to the SDRAM controller 402 is in response to the system bus clock.

Then, the SDRAM controller 402 inputs the received SDRAM clock signal CK to the SDRAM 404 in operation 1102. Accordingly, data can be written or read in response to the SDRAM clock signal CK having a frequency higher than the system bus clock signal.

Figure 12A:
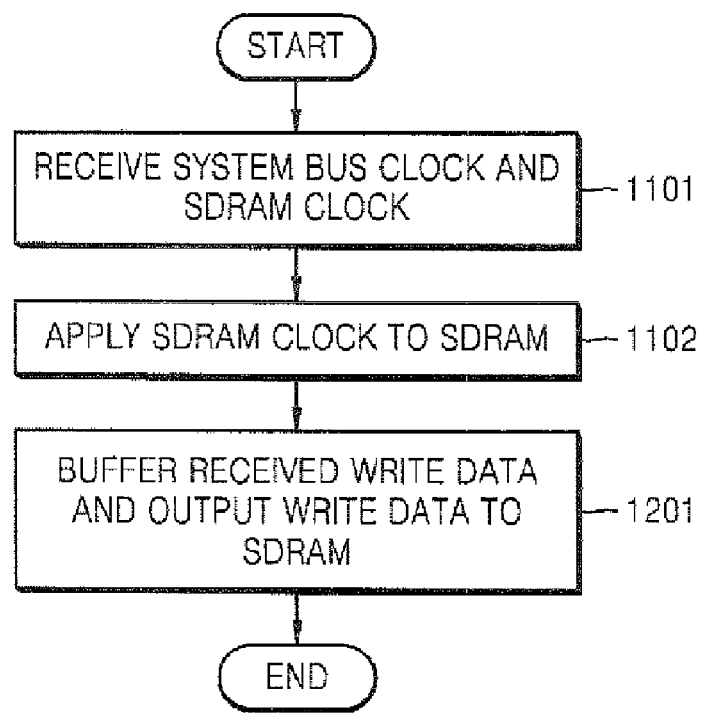
FIG. 12A is a flow chart of an operation of controlling write data in the method for controlling an SDRAM interface according to an exemplary embodiment of the present invention.
Figure 12B:
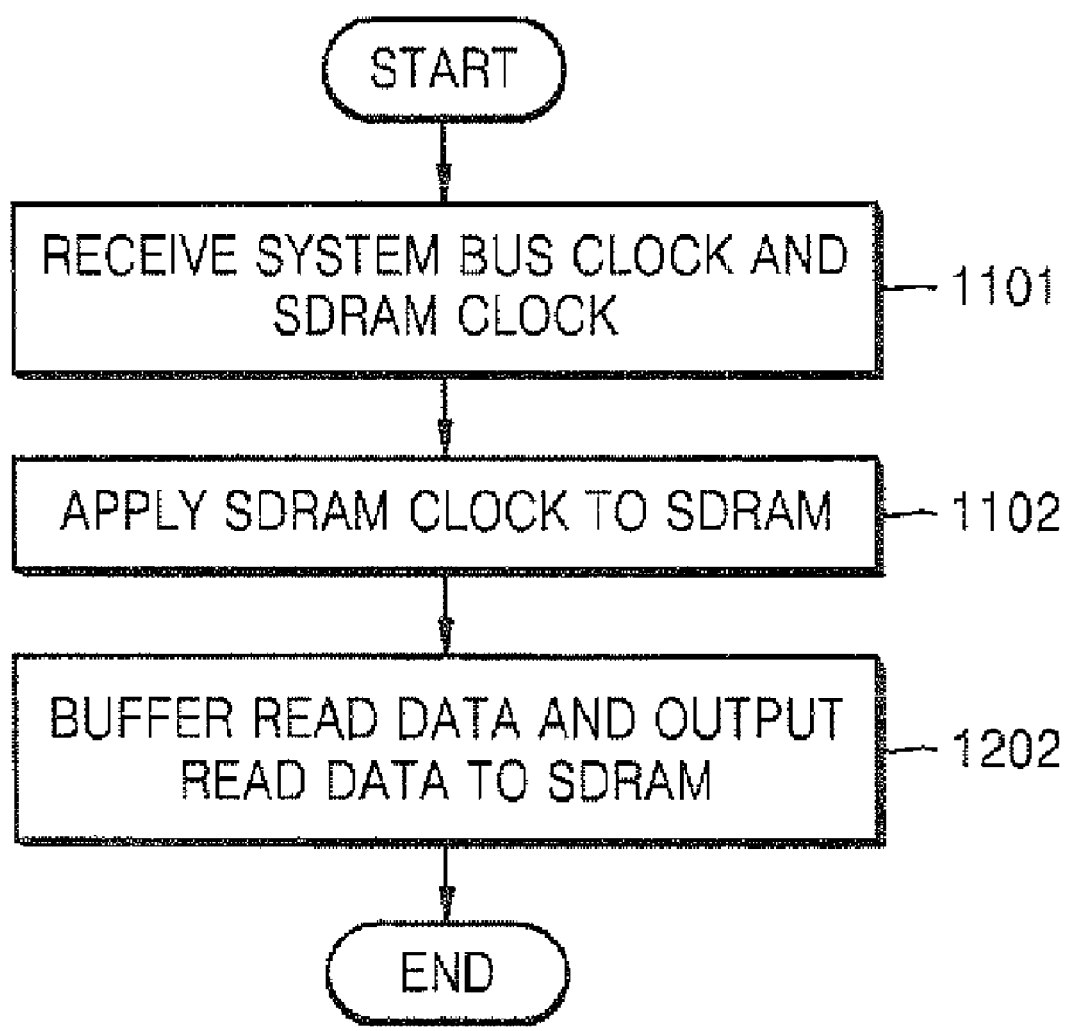
FIG. 12B is a flow chart of an operation of controlling read data in the method for controlling an SDRAM interface according to an exemplary embodiment of the present invention.

FIG. 12A is a flow chart of a method for controlling an SDRAM interface in an SDRAM controller according to another exemplary embodiment of the present invention. Referring to FIG. 12A, the method further includes operation 1201 of buffering write data received from the system bus 401 and outputting the write data to the SDRAM 404 in response to the SDRAM clock signal CK in addition to operations 1101 and 1102 illustrated in FIG. 11. FIG. 12B is a flow chart of a method for controlling an SDRAM interface in an SDRAM controller according to another exemplary embodiment of the present invention. Referring to FIG. 12B, the method further includes operation 1202 of buffering data read from the SDRAM 404 and transferring the read data to the system bus 401 in response to the system bus clock signal in addition to operations 1101 and 1102 illustrated in FIG. 11.

That is, since the frequency of the SDRAM clock signal used to write and read SDRAM data into the SOC is different from the frequency of the system bus clock signal used, the SDRAM controller 402 buffers data in FIFO memories in order to transfer data in a clock domain having the different frequencies.

As described above, the apparatus for controlling a memory interface according to exemplary embodiments of the present invention applies a memory clock signal having a frequency higher than a system bus clock signal, which is applied to a memory controller, to a memory interface. Accordingly, a higher data transfer bandwidth can be obtained with the same cost and effort as for manufacturing the conventional SOC while using a memory having a higher operating speed.

Furthermore, according to exemplary embodiments of the apparatus for controlling a memory interface according to the present invention, the finite state machine sends integrated states to the control/address signal generator and a control/address signal generator sequentially outputs detailed states of the integrated states to satisfy a minimum delay based on AC timing parameters according to the ratio of the frequency of the system bus clock signal to the frequency of the memory clock signal to remove a dummy cycle and obtain a high control/address signal transfer bandwidth.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for controlling a memory comprising:
   a memory controller which receives a system bus clock signal and applies a memory clock signal to the memory, wherein the memory controller is controlled by the system bus clock signal and the memory is controlled by the memory clock signal, and wherein a frequency of the memory clock signal is higher than a frequency of the system bus clock signal, and
   wherein the memory controller comprises:
      a finite state machine which receives the system bus clock signal and outputs a control signal or an address signal in integrated states in response to the system bus clock signal; and
      a control/address signal generator which receives the memory clock signal and sequentially outputs detailed states of the integrated states received from the finite state machine to the memory, wherein the control/address signal generator sequentially outputs the detailed state of the integrated states of the memory to satisfy AC timing parameters received from a timing register.

2. The apparatus of claim 1, wherein the memory is a Synchronous Dynamic Random Access Memory (SDRAM) selected from the group consisting of Single Data Rate (SDR) SDRAM, Double Data Rate (DDR) SDRAM, DDR2 SDRAM, a DDR3 SDRAM and a Rambus DRAM.

3. The apparatus of claim 1, wherein the frequency of the memory clock signal corresponds to an integer multiple of the frequency of the system bus clock signal.

4. The apparatus of claim 1, wherein the memory controller comprises a first First In, First Out (FIFO) memory that buffers write data received from a system bus in response to the system bus clock signal and outputs the write data to the memory in response to the memory clock signal.

5. The apparatus of claim 4, wherein the first FIFO memory comprises:
a first clock input part which receives the system bus clock signal;
a second clock input part which receives the memory clock signal;
a data input part which receives the write data in response to the system bus clock signal; and
a data output part which outputs the write data in response to the memory clock signal.

6. The apparatus of claim 4, wherein the memory controller comprises a second FIFO memory that buffers data which is read from the memory in response to the memory clock signal and outputs the read data to the system bus in response to the system bus clock signal.

7. The apparatus of claim 6, wherein the second FIFO memory comprises:
a first clock input part which receives the system bus clock signal;
a second clock input part which receives the memory clock signal;
a data input part which receives the read data in response to the memory clock signal; and
a data output part which outputs the read data in response to the system bus clock signal.

8. The apparatus of claim 1, wherein the system bus clock signal and the memory clock signal are generated by a clock generator.

9. The apparatus of claim 8, wherein the clock generator comprises a Phase-Locked Loop (PLL) or a Delay-Locked Loop (DLL).

10. The apparatus of claim 1, wherein the memory controller is located outside or inside a system-on-chip (SOC).

11. The apparatus of claim 1, wherein the memory clock signal is generated outside or inside the memory controller.

12. An apparatus for controlling a memory comprising:
a memory controller which receives a system bus clock signal and applies a memory clock signal to the memory, wherein the memory controller is controlled by the system bus clock signal and the memory is controlled by the memory clock signal, and wherein a frequency of the memory clock signal is higher than a frequency of the system bus clock signal, and
wherein the memory controller comprises:
a finite state machine which receives the system bus clock signal and outputs a control signal or an address signal in integrated states in response to the system bus clock signal;
a control/address signal generator which receives the memory clock signal and sequentially outputs detailed states of integrated states received from the finite state machine to the memory; and a timing register which transmits Alternating Current (AC) timing parameters to the control/address signal generator.

13. An apparatus, for controlling a memory interface comprising:
a memory controller which receives a system bus clock signal and applies a memory clock signal to the memory, wherein the memory controller is controlled by the system bus clock signal and the memory is controlled by the memory clock signal, and wherein a frequency of the memory clock signal is higher than a frequency of the system bus clock signal, and
wherein the memory controller comprises:
a finite state machine which receives the system bus clock signal and outputs a control signal or an address signal in integrated states in response to the system bus clock signal; and
a control/address signal generator which receives the memory clock signal and sequentially outputs detailed states of the integrated states received from the finite state machine to the memory,
wherein the integrated states include at least two detailed states, and
wherein the control/address signal generator sequentially outputs the detailed state of the integrated states of the memory to satisfy AC timing parameters received from a timing register.

14. The apparatus of claim 13, wherein the detailed states included in the integrated states are set in order.

15. A method of controlling a memory comprising:
receiving, by a memory controller, a system bus clock signal, wherein the memory controller is controlled by the system bus clock signal;
applying a memory clock signal by the memory controller to the memory, wherein the memory is controlled by the memory clock signal, and wherein a frequency of the memory clock signal is higher than a frequency of the system bus clock signal;
receiving, by a finite state machine comprising the memory controller, the system bus clock signal and outputting a control signal or an address signal in integrated states in response to the system bus clock signal; and
receiving, by a control/address signal generator, the memory clock signal and sequentially outputting detailed states of the integrated states received from the finite state machine to the memory,
wherein the sequentially outputting detailed states comprises sequentially outputting the detailed states of the integrated states to the memory to satisfy AC timing parameters received from a timing register.

16. The method of claim 15, wherein the memory is an SDRAM selected from the group consisting of a SDR SDRAM, a DDR SDRAM, a DDR2 SDRAM, a DDR3 SDRAM and a Rambus DRAM.

17. The method of claim 15, wherein the frequency of the memory clock signal corresponds to an integer multiple of the frequency of the system bus clock signal.

18. The method of claim 15, further comprising:
buffering write data received from a system bus; and
outputting the write data to the memory in response to the memory clock signal.

19. The method of claim 15, further comprising:
buffering data read from the memory; and
transferring the read data to a system bus in response to the system bus clock signal.

20. The method of claim 15, wherein the memory clock signal is generated outside or inside the memory controller.

* * * * *